June 5, 1951     W. N. OLSON ET AL     2,555,555
TWO-WAY PLOW
Filed July 2, 1945     3 Sheets-Sheet 3
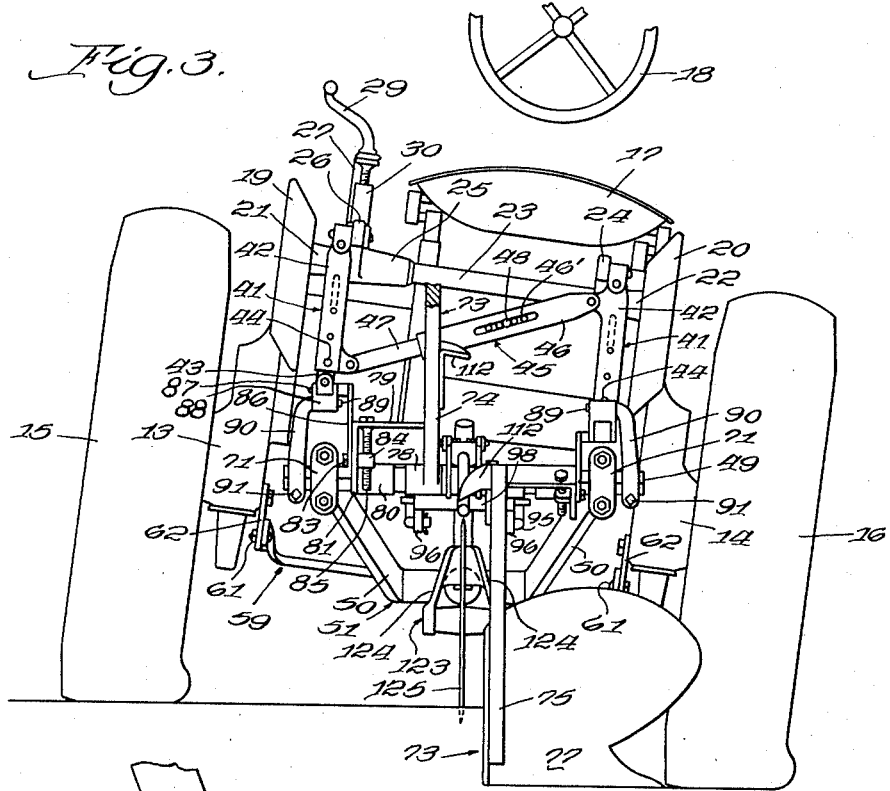
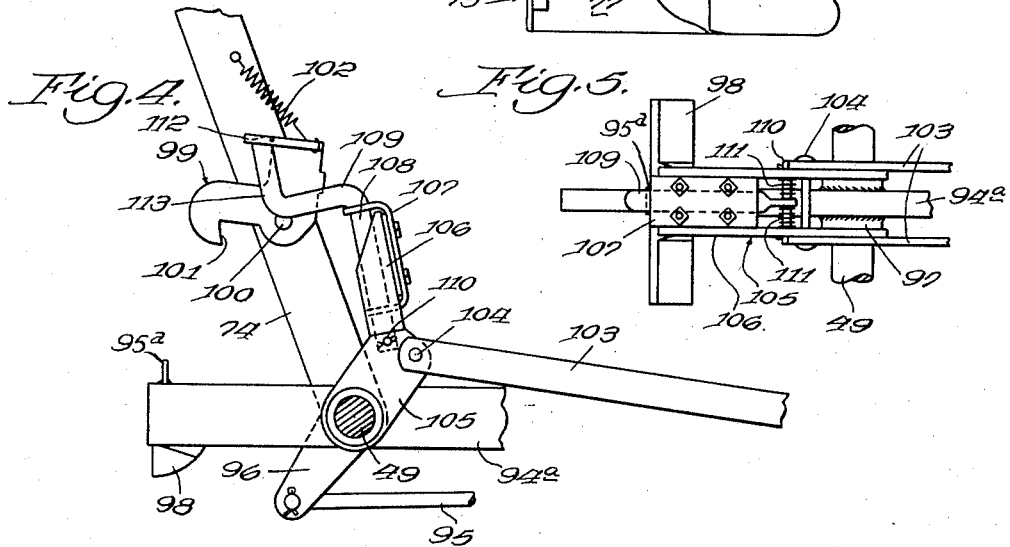
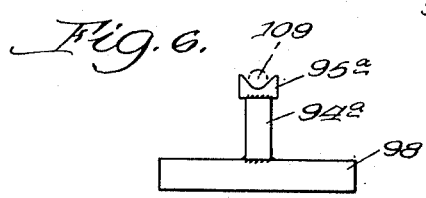
Inventors:
William N. Olson
and Arthur G. Evans.
By Paul O. Pippel
Atty.

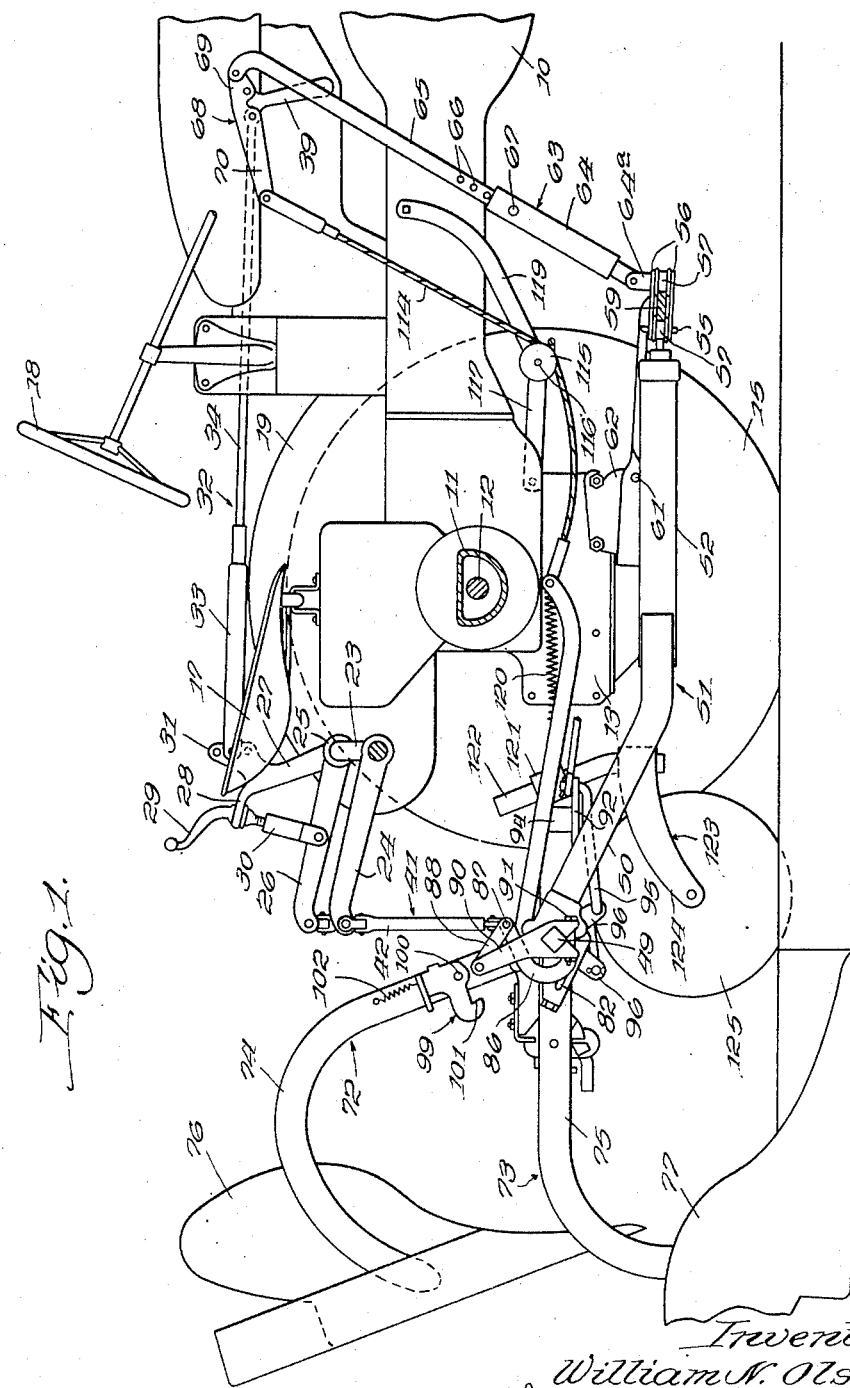

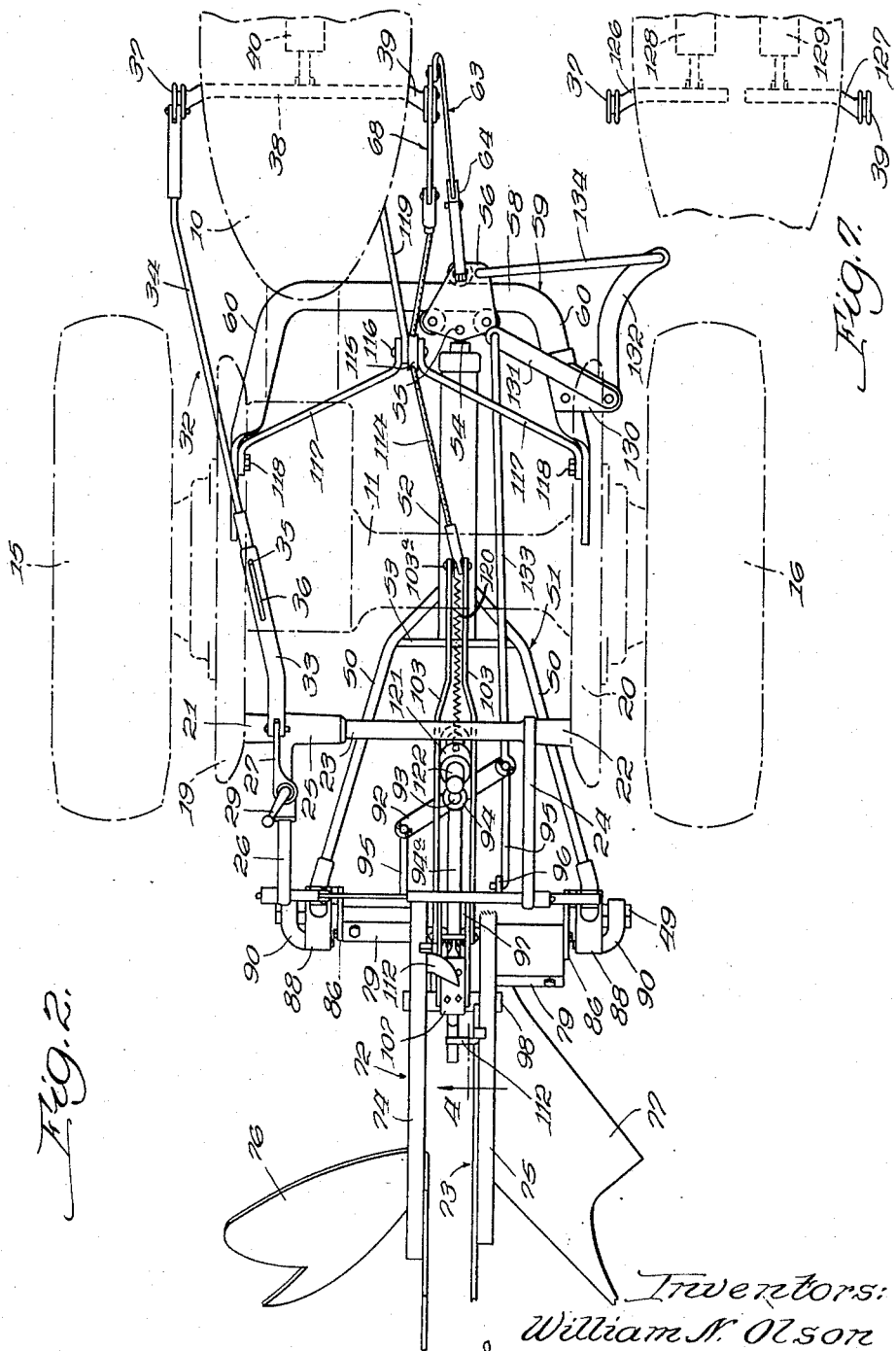

Patented June 5, 1951

2,555,555

UNITED STATES PATENT OFFICE 2,555,555

TWO-WAY PLOW

William N. Olson and Arthur G. Evans, Canton, Ill., assignors to International Harvester Company, a corporation of New Jersey Application July 2, 1945, Serial No. 602,762

8 Claims. (Cl. 97—29)

This invention relates to agricultural implements and particularly to those adapted to be mounted upon a tractor or the like to be carried thereby. More specifically, the invention concerns a tractor-mounted two-way plow.

An object of the invention is to provide a novel two-way plow of improved construction.

Another object is to provide a tractor-mounted agricultural implement having improved means for controlling the operation thereof.

Still another object is to provide in a tractor-mounted agricultural implement novel means for leveling the earth-working tool when one wheel of the tractor is traveling in a furrow.

Another object is to provide, in a tractor-mounted two-way plow, lift means on the tractor for vertically moving the entire implement to and from transport position, and separate means for alternately operating the individual plow units.

Other objects and advantages will become clear from the following detailed description when read in conjunction with the accompanying drawings, wherein:

Figure 1 is a view in side elevation of the rear portion of a tractor with one wheel removed and showing attached thereto a two-way plow embodying the features of the present invention;

Figure 2 is a plan view of the structure shown in Figure 1;

Figure 3 is a rear elevation of the structure shown in Figures 1 and 2 with parts removed for clarity and showing the right-hand plow bottom in operating position;

Figure 4 shows an enlarged detail of the lifting structure by which the alternately operable plow units are moved to and from operating position;

Figure 5 is a plan view of the structure shown in Figure 4 prior to the lifting operation;

Figure 6 is a detail of a portion of the structure shown in Figure 5; and

Figure 7 is an alternate arrangement of power mechanism on the tractor, wherein two separate rock-shafts are utilized and rocked by a separate power mechanism.

Referring to the drawings, it will be noted, particularly well in Figure 2, that the implement of the present invention is mounted upon a tractor having a laterally offset longitudinally extending body 10, a rear axle housing 11, a transverse rear axle 12 and depending stub axle housings 13 and 14 upon which are mounted respectively rear drive wheels 15 and 16. The tractor is provided with an operator's seat 17 and a steering mechanism 18.

Secured to the rear axle housing and at opposite sides thereof are conventional fenders 19 and 20 to which are secured bearing members 21 and 22 serving to rotatably support the ends of a transverse shaft 23. Secured to the shaft 23 at the right side thereof is a rearwardly extending arm 24, and mounted upon a sleeve 25 rotatable upon the shaft 23 at the left side thereof is another arm 26 parallel to arm 24. Likewise fastened to the shaft 23 adjacent the sleeve 25 is an upwardly extending arm 27 provided with an ear 28 having an opening therein to receive the threaded end of a crank 29 seated in a correspondingly threaded sleeve member 30 having its lower end bifurcated and pivoted upon the arm 26, for adjustment of the arm 26 vertically. A forwardly projecting lug 31 has attached thereto a forwardly extending lifting member 32 comprising a sleeve 33 pivotally attached at its rear end to the lug 31 and adapted to receive therein a rod 34, the rear end of which is slidable in the sleeve 33, and in which is provided a radially projecting pin 35 which extends outwardly through a slot 36 in the sleeve 33, so that a limited amount of lost motion is provided between the rod 34 and the sleeve 33. The forward end of rod 34 is pivotally connected to a rock-arm 37 mounted upon the left-hand end of a transverse rock-shaft 38 extending from one side of the tractor body to the other and having secured to the right-hand end thereof, on the other side of the tractor body, a rock-arm 39. This rock-shaft may be rocked about its axis by any suitable means, for example, by a double acting hydraulic cylinder, indicated at 40, and deriving power from the tractor motor in a manner not shown. It should now be clear that rocking in a fore and aft direction of the arm 37, acting through the member 32, will also rock the shaft 23 to which are secured the arms 24 and 27.

As best shown in Figure 3, there are pivotally secured to the rearwardly extending ends of arms 24 and 26 a pair of laterally spaced depending lifting links 41. These links include a sleeve member 42 and a shaft member 43. Openings are provided in the sleeve 42 and shaft 43 adapted to register to receive a pin 44, a number of openings being provided to permit adjusting of the links 41. The lower end of left-hand sleeve member 42 and the upper end of right-hand member 42 are connected by a similarly telescoping link 45 which includes a sleeve 46 and a shaft 47. The sleeve 46 is provided with a slot 46' adapted to receive a pin 48 passed through openings in the shaft 47 to permit limited telescoping movement of the link 45, so that the links 41 will be permitted a certain amount of lateral swinging movement about their pivotal connections to the arms 24 and 26. The arms 24 and 26 and the links 41 function as lifting mechanism for the two-way plow of the present invention in order to move it to and from transport position on the tractor, separate means being provided, as will hereinafter become clear, for moving the alternately operable plow units into and out of ground working position.

In Figures 1, 2 and 3 of the drawings, the implement is shown with the right-hand plow bottom in earth-working position and with the left-hand plow bottom raised to inoperative position. As will be noted in Figure 3, when the right-hand plow bottom is in working position, the right-hand tractor wheel 16 is traveling in the furrow previously made and is at a lower level than the left-hand tractor wheel 15 which is traveling upon the surface of the unplowed ground. Of course, when the direction of plowing is reversed, the right-hand plow bottom is raised to an inoperative position, the left-hand tractor wheel travels in the furrow, and the left-hand plow bottom is placed in operating position.

The two-way plow of the present invention includes a transverse tool-bar 49 of generally round cross-section to which are secured, adjacent opposite ends thereof, the ends of rearwardly diverging arms 50 forming a part of a generally Y-shaped frame indicated at 51. The arms 50 converge forwardly and are secured to a longitudinally extending tubular member 52, the rear end of which is braced by a cross-piece 53 extending between the arms 50. The internal structure of the tubular or stem member 52 forms no part of the present invention and is preferably such as that disclosed in United States Patent No. 2,420,530, and is provided with a resiliently held member 54 slidable within the tubular member 52 against the action of a spring, not shown. The member 54 is pivotally secured by a pin 55 to a pair of vertically spaced plates 56 spaced by rollers 57 triangularly arranged to embrace opposite sides of the transverse portion 58 of a drawbar 59. It will be noted in Figure 2 that the rollers 57 are so arranged that two of them engage the rear edge of the drawbar 59 and one of them engages the forward edge thereof. The space between the plates 56 is such that movement of the plate members along the transverse portion 58 of the drawbar is accommodated. The drawbar 59 is U-shaped and the laterally spaced arms 60 thereof are pivotally connected by bolts 61 to brackets 62 secured to the depending axle housings 13 and 14. The drawbar 59 thus is capable of vertical swinging movement about the pivots 61.

To the upper plate 56 is pivotally secured the lower end of a telescoping link 63 including a sleeve member 64 pivotally attached to a lug 64a secured to the upper plate 56. A shaft 65 is provided with a number of openings 66 to receive a pin 67 passed through the sleeve 64 for adjusting the effective length of the link 63. The upper end of shaft member 65 is connected to the rock-arm 39 secured to the right-hand end of rock-shaft 38, through the intermediary of an extension member 68 bolted to the arm 39. Member 68 has a short portion 69 extending forwardly from the arm 39 to which the shaft 65 is pivotally attached. Member 68 also is provided with a longer rearwardly extending portion 70. It should now be clear that the drawbar 59, and therefore the forward end of frame member 51, may be moved up and down by rocking the arm 39. It should also be understood that the connection of sleeve 64 to the lug 64a is sufficiently loose to accommodate the lateral movement of the hitch frame 51 along the drawbar 59.

The rearwardly diverging ends of arms 50 of frame member 51 are secured to the transverse tool-bar 49 by clamps 71.

Pivotally connected to transverse tool-bar 49 for vertical swinging movement with respect thereto are laterally spaced plow units 72 and 73 including, respectively, tool-beams 74 and 75 which curve downwardly at their rear ends and are provided with plow bottoms 76 and 77. These plow units are substantial duplicates and, generally, a description of one will suffice for both. As clearly shown in Figure 3, beam 74 is provided at its forward end with a bearing portion 78 mounted upon a cylindrical portion of the tool-bar 49. Likewise secured to the forward end of the beam is a rectangular box-like member 79 which extends laterally from the beam and is provided with a bearing portion 80 also rotatable upon a cylindrical portion of the bar 49. A side wall 81 of member 79 opposite the beam 74 is provided with a slot 82 in which is adjustably mounted a bolt 83 having secured to the inner end thereof a member 84 threaded to receive a bolt 85 extending through an opening in the rear wall of the member 79 and held against relative displacement therein. By turning the bolt 85 in the member 84, the bolt 83 can be adjusted in the slot 82, the purpose of which will hereinafter become clear.

Also mounted upon the bolt 83 is an arcuate link 86 which curves upwardly and forwardly and is provided at its end with a pin 87 which also pivotally mounts the lower end of the shaft member 43 of link 41. Likewise pivoted upon the pin 87 is one end of a link 88, the other end of which is pivotally connected to the inwardly projecting end 89 of an upwardly extending arm 90 having a socket portion shaped to fit the squared outer ends of the tool-bar 49 and secured thereto by bolts 91.

Since the point of connection of the arcuate link 86 to the bolt 83 is spaced from the pivot axis of the beam 74 upon the tool-bar 49, it should be clear that when the beam is raised from the ground to the position shown in the drawings, the link 86 will urge the link 88 upwardly about its pivot upon the arm 90. Thus the distance between the point of connection of link 41 with arm 26 and the pivot axis of tool-bar 49 will be increased. The purpose of this increase in the effective length of the linkage including links 41 and 86 on the side of the raised plow unit is to automatically level the plow bottom which is in working position. Thus the tool-bar 49 is permitted to remain parallel with the ground at all times so that the plow bottom 77 will be in proper relation to the ground through which it passes. The mechanism just described by which the beam 74 is connected to the tool-bar and to the lifting linkage is, of course, duplicated with the plow unit 73.

In order to equalize the plow units and provide for one of them to remain in raised position during operation of the other, a mechanism is provided including an equalizer bar 92 which extends transversely of the implement and has secured to the center thereof a pin 93 rotatably mounted in a bearing 94 secured to the forward end of a bar 94a. The equalizer bar 92 thus has pivotal movement about a vertical axis. Each end of the equalizer bar 92 is connected by a link 95 with a lug 96 depending from the member 79 of the respective plow units. Thus upon vertical swinging movement of the plow units, one into raised position and the other into ground working position, the lugs 96 of the respective plow units are rocked in opposite directions. In other words, upon raising the plow unit 72 to inoperative position, as indicated in the drawings, lug 96 of that plow unit swings rearwardly and causes the equalizer bar to assume the position shown in Figure 2. Simultaneously, the downward movement of the right-hand plow unit 73 to working position causes the lug 96 on that unit to move forwardly to swing the equalizer bar about its pivot. The unit in inoperative position is held there by the engagement of latch 99 with block 98 carried by main frame bar 94a.

The bar 94a extends rearwardly and at its intermediate portion is provided with a bearing portion 97 mounted upon a cylindrical center portion of the tool-bar 49, as indicated in Figures 2 and 5. The end of bar 94a projecting rearwardly from the tool-bar 49 has secured to the lower portion thereof, as by welding, a transverse wedge-shaped block 98 shown in detail in Figure 6. This block serves to clamp the operating plow unit in position by a mechanism including a latch 99 pivoted at 100 to the plow beam 74, as shown in Figure 4. When the plow unit is in operating position, the hook portion 101 of latch 99 engages the under-surface of the block 98 to hold the plow unit against upward movement. The latch 99 is biased to engaged position with block 98 by a spring 102 connected to the plow beam and the latch.

Alternate raising and lowering of the plow bottoms to and from working position is accomplished by a lifting mechanism including a pair of laterally spaced straps 103, the rear ends of which are pivotally mounted upon a pin 104 seated in the laterally spaced arms of a rockable member 105 which is pivotally mounted upon the tool-bar 49 centrally thereof for rocking movement in a forward and rearward direction. Arm 105 is provided with an extension 106, having secured between the laterally spaced portions thereof a U-shaped bracket 107, having openings in the bent portions thereof to receive the shank 108 of a crank 109. The forward end of the shank portion 108 is provided with an opening to receive a pin 110 which extends through the laterally spaced portions of the arm 105 and is provided therebetween with springs 111, one on each side of the shank 108. The opening in the end of shank 108, which receives the pin 110, is considerably larger than the pin to allow angular movement of the crank 109 with respect to the pin 110 against the action of the springs 111. While the springs 111 tend to hold the crank 109 in a centered position, as indicated in Figure 5, a certain amount of lateral play of the crank is permitted, the springs tending to return the crank to its normal centered position.

As shown in the drawings, particularly Figures 1, 3 and 4, each of the latches 99 pivoted on the beams 74 and 75 is provided with a lug 112 having its under-surface angled outwardly and downwardly as indicated in Figure 3. When the plow unit is in operating position, the lug 112 lies directly over a rearwardly extending portion 113 of crank 109 in the relationship shown in Figure 3, so that upon upward movement of the crank 109, due to forward rocking of the arm 105 about its pivot on the bar 49, the portion 113 of the crank will engage the under surface of the lug 112 near its outer end. In the centered position of the crank 109, the shank portion 108 thereof is seated in an arcuate notch in a member 95a secured to the upper surface of the member 94a. Upon rocking arm 105 the crank will ride upwardly and outwardly along the lower inclined surface of the lug and will be deflected laterally to hook itself securely under the lug 112. The forward ends of straps 103 are spaced by a pin 103a to which is connected one end of a flexible member 114 which extends forwardly and upwardly and engages near its intermediate portion a roller 115 mounted upon a pin 116 in the ends of brackets 117 secured to the tractor by bolts 118. Brackets 117 are further braced by a strap 119 secured to the side of the tractor body. The forwardly extending end of flexible member 114 is pivotally secured to the rearwardly extending arm 70 of the extension 68 on rock-arm 39. Upon rocking of the rock-shaft 38 and forward movement of arm 39, the flexible member 114 is brought forward to pivot the arm 105 forwardly about its connection to the transverse tool-bar 49, thus engaging the crank 109 with the lug 112 of the plow unit in operating position and raising it to inoperative position. The direction of movement of rock-arm 39 is then reversed and the arm 105 permitted to pivot in the opposite direction to return the crank 109 to an operative position with respect to the plow unit then in working position. Slack is then introduced into the flexible member 114, as indicated in Figure 1. Limited movement of the rock-arm 39 with raising and lowering of the draw-bar 59 and the plow hitch point may now be effected to adjust the depth of operation of the plow without actuating the mechanism which raises the individual units to inoperative position.

As pointed out before, each of the latches 99 on the plow units 72 and 73 is provided with a latch lug 112 so that each is alternately engageable with the crank 109. Upon return of the crank to operating position, after lifting the inoperative plow bottom, the rearwardly extending portion 113 of the crank is deflected laterally by the downwardly curved upper portion of the lug 112 and is brought back to a centered position therebelow through the action of the springs 111.

The crank 109 is urged back to operative position with respect to the working plow bottom by a spring 120, the forward end of which is secured to the pin 103a and the rear end of which is anchored in a manner that will hereinafter appear. Secured to the bearing 94 forwardly thereof is another bearing 121 set at an angle to the axis of bearing 94. The rear end of spring 120 is anchored to the bearing 121. Adjustably mounted in the bearing 121 is a generally vertically extending standard 122 secured against rotation preferably by a set-screw or the like, not shown. To the lower portion of the standard 122 is secured a bracket 123 which comprises laterally spaced elements 124 extending rearwardly and having bearings at the end thereof to support a coulter 125.

As will be noted in Figures 1 and 3, the coulter 125 rides directly in front of the operating plow bottom and is spaced slightly from the landward side thereof. The function of a coulter, as is well known in the art, is to slice the ground in advance of the plow bottom and open a path therefor. Due to the close proximity of the plow units 72 and 73, the coulter is so arranged that it is in position to function for either plow bottom. It is thus possible to eliminate a great deal of the weight that would be added to the implement by the use of a second coulter, and likewise in a compact implement, such as that shown and described, wherein space is at a premium, it is important to reduce to a minimum the number of parts which might interfere with the efficient operation of the implement. In some instances it is desirable to utilize a gauge wheel and such a wheel may be supported by the same standard that supports the coulter 125; for example, the combination gauge wheel and coulter unit shown and described in United States Patent No. 2,420,551, may be employed.

As pointed out before, lifting of the entire implement to transport position on the tractor is accomplished by rocking the shaft 38 to move the arm 37 forwardly. Let us assume that the implement is in the position shown in Figure 1 and that it is desired to raise it to its transport position. Arms 37 and 39 are rocked forwardly. Due to the arc of movement of arm 39 from the position indicated in Figure 1, and link 63 connecting the arm to the draw-bar 59, the draw-bar and therefore the front end of the frame member 51 is raised. Pin 35 abuts the forward end of slot 36 and the entire implement is lifted. By virtue of the connection of opposite ends of equalizer bar 92 to lugs 96 of the respective plow units it is, of course, impossible for both of the plow units to be raised to inoperative position by power. A glance at Figure 2 will show that the plow units are balanced and that one of them cannot be lifted without causing lowering of the other. It is customary, therefore, after the implement has been lifted to transport position from an operating position such as that shown in Figure 1, to swing the lowered plow unit 73 upwardly by hand to a position alongside the left hand unit 72. This, of course, necessitates manually releasing the latch 99, and in order to raise the unit 73, unit 72 must be lowered somewhat, so that in their transport position the two units occupy a position approximately midway between the ground working and inoperative positions illustrated in Figure 1. Thus it should be clear that while the implement as a whole may be raised and lowered bodily by the arms 24 and 26 and the lifting linkage comprising links 41 and 86, the inoperative position of each of the units 72 and 73 involves an additional movement thereof about their pivotal connections to the tool-bar 49, and this is accomplished by the connection of rock-arm 39 through member 114, straps 103 and crank 109 alternately engaging one of the latches 99.

The operation of the individual plow units to alternately move them between ground working and inoperative positions is accomplished by the forward rocking of arm 39 on the right-hand side of the tractor, which consequently actuates the crank 109 to lift the working plow bottom. This rocking of the arm 39 likewise raises the hitch point of the plow by virtue of the member 63 connecting the rock-arm with the lug 64ᵃ, thus tilting the point of the plow bottom upwardly and permitting it to ride out of the ground. Therefore the raising of the individual plow units by movement of the arm 39 necessarily involves a certain amount of lifting movement of the entire implement through the intermediary of rock-arm 37 and lifting member 32.

In the modification shown in Figure 7, separate rock-shafts 126 and 127 may be utilized in place of the single rock-shaft 38. In such case, the rock-shafts 126 and 127 are rocked respectively by separate hydraulic cylinders 128 and 129. These cylinders may likewise be powered from the tractor motor and independently controlled in any suitable manner, not shown, to provide for independent rocking of the shafts 126 and 127. In this form of invention, the rock-arm 39 may be actuated to alternately operate the plow units and regulate the depth of operation thereof without involving lifting of the implement as a whole. Likewise, if desired, independent means may be provided for laterally adjusting the hitch point. Such control is of importance in side hill plowing where it is often necessary to compensate for downhill shifting of the operating plow bottom.

The two units of a two-way plow, of course, occupy different draft relations with respect to the draft vehicle, and when alternate plow bottoms are placed in operation the hitch point of the implement must be laterally moved so that the working plow bottom may be in correct plowing position with respect to the vehicle. It is therefore necessary to provide means for adjusting the point of connection of the implement to the tractor. As previously noted, the hitch frame 51 is connected to the draw-bar 59 by means permitting lateral movement of the hitch frame to a position in alinement with the plow unit which is in operating position. In order to accomplish this shifting of the hitch point, a bracket 130 is secured to the draw-bar, and pivoted thereupon is a bell-crank having arms 131 and 132. Arm 131 is connected by a rod 133 with the equalizing bar 92 and on the right-hand end thereof. The other arm 132 of the bell-crank is connected by a rod 134 with one of the plates 56. Upon forward movement of the rock-arm 39 to move the plow unit 72 from an operating position to the raised position, indicated in the drawings, the link 95 connecting the plow unit to the equalizer bar 92 on the left-hand side is pushed rearwardly. The forward pivoting of the right-hand side of the equalizer bar 92, acting through connecting rod 133, rocks the bell-crank arms 131 and 132 about their pivotal connection with the bracket 130 to move the hitch frame and the point of connection thereof to the draw-bar toward the right to properly line the hitch point with the plow unit 73 which is in operating position. This forward movement of the right-hand side of equalizer bar 92 likewise rocks the lug 96 forwardly and moves the plow unit 73 into operating position.

It should now be clear that a novel tractor-mounted two-way plow has been described embodying many useful and novel features. While the invention has been described in its preferred embodiment, however, it should be understood that modifications may be made therein without departing from the spirit of the invention or the scope of the appended claims.

What is claimed is:

1. In combination with a tractor having a hitch point, an agricultural implement connected to the tractor to be at least partly supported thereby, comprising a longitudinally extending tool-carrying structure connected at its forward end to the tractor at said hitch point for vertical swinging movement about a transverse axis, means for laterally adjusting the forward end of said tool-carrying structure at said hitch point, and means accommodating said lateral adjustment for simultaneously adjusting the forward end of said tool-carrying structure generally vertically.

2. The combination with a tractor having a movable hitch point, of a two-way plow including a frame, means connecting the frame to the tractor at said hitch point for lateral movement with respect thereto to change the location of the hitch point, a pair of laterally spaced plow units alternately movable between ground-working and inoperative positions, power means on the tractor, releasable means connecting said power means to the unit in ground-working position for raising said unit to inoperative position, and means operatively connecting the latter unit to said frame adjacent said hitch point to laterally move said hitch point in response to the raising of said unit to inoperative position.

3. The combination with a tractor having a movable hitch point, of a two-way plow including a frame, means connecting the frame to the tractor at said hitch point for lateral movement with respect thereto to change the location of the hitch point, a pair of laterally spaced plow units alternately movable between ground-working and inoperative positions, power means on the tractor, releasable means connecting said power means to the unit in ground-working position for raising said unit to inoperative position, and means responsive to lifting of said latter unit for moving said hitch point laterally and for simultaneously lowering the inoperative unit to ground-working position.

4. In combination with a tractor having a movable hitch point and power-lift mechanism thereon, a two-way plow pivotally connected to the tractor in draft receiving relation thereto at said hitch point to be supported thereby for vertical swinging movement about a transverse axis, comprising laterally spaced plow units adapted for alternate operation, a pair of rock arms on the tractor, lift means connecting one of said arms to said plow for raising said units simultaneously to transport position, means operatively connecting the other of said arms to said units for placing the plow units in position for alternate operation thereof, means connecting said other arm to the plow adjacent said hitch point for vertically adjusting the latter simultaneously with placing the plow units in position for alternate operation, and power means for rocking said rock arms.

5. In a tractor-mounted agricultural implement, power means on the tractor, an implement frame, a pair of vertically extending laterally spaced lifting link structures connecting the power means to the frame for moving the implement into and out of operating position, one said link structure including relatively movable parts automatically operable during movement of the implement to increase the effective length of said link structure, whereby to level the implement.

6. In a tractor-mounted two-way plow, power lift means on the tractor, means serving as a plow frame connected to the tractor for generally vertical movement with respect thereto, laterally spaced plowing units carried by said frame and alternately movable with respect thereto to and from operating position, a pair of laterally spaced lifting link structures connecting the power-lift means to said frame to raise and lower the latter with respect to the tractor, and means for increasing the effective length of one said link structure in response to the movement of one of said units to inoperative position.

7. In a tractor-mounted two-way plow, power lift means on the tractor, means serving as a plow frame connected to the tractor for generally vertical movement with respect thereto, laterally spaced plowing units carried by said frame and alternately movable with respect thereto to and from operating position, a pair of laterally spaced lifting link structures connecting the power lift means to said frame to raise and lower the latter with respect to the tractor, means for increasing the effective length of one said link structure in response to the movement of one of said units to inoperative position, and means for adjusting the extent of said increase.

8. In combination with a tractor having a movable hitch point and power-lift mechanism thereon, a two-way plow pivotally connected to the tractor in draft receiving relation thereto at said hitch point to be supported thereby for vertical swinging movement about a transverse axis, comprising laterally spaced plow units adapted for alternate operation, a rock shaft on the tractor, a pair of rock arms on said shaft, lift means connecting one of said arms to said plow for raising said units simultaneously to transport position, means operatively connecting the other of said arms to said units for placing the plow units in position for alternate operation thereof, means connecting said other arm to the plow adjacent said hitch point for vertically adjusting the latter simultaneously with placing the plow units in position for alternate operation, and power means for rocking said rock arms.

WILLIAM N. OLSON.
ARTHUR G. EVANS.

REFERENCES CITED

The following references are of record in the file of this patent:

UNITED STATES PATENTS

| Number | Name | Date |
| --- | --- | --- |
| 441,891 | Pehrson | Dec. 2, 1890 |
| 1,187,859 | Parker | June 30, 1916 |
| 1,363,755 | Reynolds | Dec. 28, 1920 |
| 1,381,662 | Reynolds | June 14, 1921 |
| 1,446,826 | Brown | Feb. 27, 1923 |
| 1,902,845 | Graham et al. | Mar. 28, 1933 |
| 2,204,487 | Glorfield | June 11, 1940 |
| 2,302,502 | Morkoski et al. | Nov. 17, 1942 |
| 2,306,814 | Knapp | Dec. 29, 1942 |
| 2,312,616 | Altgelt | Mar. 2, 1943 |
| 2,344,474 | Tanke | Mar. 14, 1944 |
| 2,358,964 | Noffsinger | Sept. 26, 1944 |
| 2,395,322 | Evans | Feb. 19, 1946 |
| 2,416,207 | Olson | Feb. 18, 1947 |
| 2,420,530 | Evans | May 13, 1947 |
| 2,424,192 | Rogers et al. | July 15, 1947 |
| 2,437,879 | Ferguson | Mar. 16, 1948 |